US012755137B2

(12) United States Patent
Jin

(10) Patent No.: US 12,755,137 B2
(45) Date of Patent: Oct. 6, 2026

(54) DATA PROCESSING SYSTEM, OPERATING METHOD THEREOF, AND COMPUTING SYSTEM USING THE SAME

(71) Applicant: SK hynix Inc., Gyeonggi-do (KR)

(72) Inventor: Young Jae Jin, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 1129 days.

(21) Appl. No.: 17/721,727

(22) Filed: Apr. 15, 2022

(65) Prior Publication Data

US 2023/0061729 A1 Mar. 2, 2023

(30) Foreign Application Priority Data

Sep. 1, 2021 (KR) ........................ 10-2021-0116331

(51) Int. Cl.
*G06N 3/063* (2023.01)
*G06F 9/48* (2006.01)
*G06F 9/54* (2006.01)
*G06N 3/04* (2023.01)

(52) U.S. Cl.
CPC ........... *G06N 3/063* (2013.01); *G06F 9/4881* (2013.01); *G06F 9/544* (2013.01); *G06N 3/04* (2013.01)

(58) Field of Classification Search
CPC ........ G06N 3/063; G06N 3/04; G06F 9/4881; G06F 9/544
See application file for complete search history.

(56) References Cited

U.S. PATENT DOCUMENTS

2018/0046900 A1 2/2018 Dally et al.
2021/0158132 A1 5/2021 Huynh et al.
2021/0271960 A1 * 9/2021 Raha .................... G06F 9/3001
(Continued)

FOREIGN PATENT DOCUMENTS

CN 101442315 A 5/2009
CN 108073981 A 5/2018
CN 109918204 A 6/2019
(Continued)

OTHER PUBLICATIONS

Shafiee, Ali, et al. "ISAAC: A convolutional neural network accelerator with in-situ analog arithmetic in crossbars." ACM SIGARCH Computer Architecture News 44.3 (2016): 14-26. (Year: 2016).*
(Continued)

*Primary Examiner* — Andrew T Chiusano
(74) *Attorney, Agent, or Firm* — IP&T GROUP LLP

(57) ABSTRACT

A data processing system includes a controller configured to receive a neural network operation processing request from a host device; and an in-memory computing device including a plurality of processing elements. The in-memory computing device is configured to receive an input feature map and a weight filter from the controller, and perform a neural network operation in the plurality of processing elements based on the weight filter and a plurality of division maps generated from the input feature map, wherein the in-memory computing device performs the neural network operation by not moving a reused element, which is operated at least twice among elements constituting the division maps during the neural network operation, between the processing elements.

27 Claims, 11 Drawing Sheets

| | | Element using in each of Convolution Cycle | | | | | | | | | | | | | | | | PIBUF Update Count | | | | | |
|---|---|---|---|---|---|---|---|---|---|---|---|---|---|---|---|---|---|---|---|---|---|---|---|
| Time | SAidx | PE1 | | | | PE2 | | | | PE3 | | | | PE4 | | | | PE1 | PE2 | PE3 | PE4 | Total | GBUF read |
| 0 | 0 | 1 | | | | 9 | | | | 2 | | | | 10 | | | | 1 | 1 | 1 | 1 | 4 | 4 |
| 1 | 1 | | 3 | | | 9 | 11 | | | 2 | | | | 10 | | | | 1 | 1 | 0 | 0 | 2 | 2 |
| 2 | 2 | | 3 | | | 9 | 11 | | | | 4 | | | 10 | 12 | | | 0 | 0 | 1 | 1 | 2 | 2 |
| 3 | 3 | | | 5 | | 9 | 11 | 13 | | | 4 | | | 10 | 12 | | | 1 | 1 | 0 | 0 | 2 | 2 |
| 4 | 4 | | | 5 | | 9 | 11 | 13 | | | | 6 | | 10 | 12 | 14 | | 0 | 0 | 1 | 1 | 2 | 2 |
| 5 | 5 | | | | 7 | 9 | 11 | 13 | 15 | | | 6 | | 10 | 12 | 14 | | 1 | 1 | 0 | 0 | 2 | 2 |
| 6 | 6 | | | | 7 | 9 | 11 | 13 | 15 | | | | 8 | 10 | 12 | 14 | 16 | 0 | 0 | 1 | 1 | 2 | 2 |
| 7 | 7 | 17 | | | | 9 | 11 | 13 | 15 | 18 | | | | 10 | 12 | 14 | 16 | 1 | 0 | 1 | 0 | 2 | 2 |
| 8 | 8 | 17 | 19 | | | | 11 | 13 | 15 | 18 | | | | 10 | 12 | 14 | 16 | 1 | 0 | 0 | 0 | 1 | 1 |
| 9 | 9 | 17 | 19 | | | | 11 | 13 | 15 | 18 | 20 | | | | 12 | 14 | 16 | 0 | 0 | 1 | 0 | 1 | 1 |
| 10 | 10 | 17 | 19 | 21 | | | | 13 | 15 | 18 | 20 | | | | 12 | 14 | 16 | 1 | 0 | 0 | 0 | 1 | 1 |
| 11 | 11 | 17 | 19 | 21 | | | | 13 | 15 | 18 | 20 | 22 | | | | 14 | 16 | 0 | 0 | 1 | 0 | 1 | 1 |
| 12 | 12 | 17 | 19 | 21 | 23 | | | | 15 | 18 | 20 | 22 | | | | 14 | 16 | 1 | 0 | 0 | 0 | 1 | 1 |
| 13 | 13 | 17 | 19 | 21 | 23 | | | | 15 | 18 | 20 | 22 | 24 | | | | 16 | 0 | 0 | 1 | 0 | 1 | 1 |
| 14~20 | | | | | | | | | | | | | | | | | | | | | | 8 | 8 |
| 21~27 | | | | | | | | | | | | | | | | | | | | | | 8 | 8 |
| 28~34 | | | | | | | | | | | | | | | | | | | | | | 8 | 8 |
| 35~41 | | | | | | | | | | | | | | | | | | | | | | 8 | 8 |
| 42~48 | | | | | | | | | | | | | | | | | | | | | | 8 | 8 |
| | | | | | | | | | | | | | | | | | | | | | | 64 | 64 |

(56) References Cited

U.S. PATENT DOCUMENTS

2021/0374514 A1* 12/2021 Tsai ........................ G06N 3/08

FOREIGN PATENT DOCUMENTS

| | | | |
|---|---|---|---|
| CN | 112926731 | A | 6/2021 |
| KR | 10-2019-0111810 | A | 10/2019 |
| KR | 10-2020-0027011 | A | 3/2020 |

OTHER PUBLICATIONS

Mao, Manqing, et al. "MAX 2: An ReRAM-based neural network accelerator that maximizes data reuse and area utilization." IEEE Journal on Emerging and Selected Topics in Circuits and Systems 9.2 (2019): 398-410. (Year: 2019).*

Qiao, Ximing, et al. "AtomLayer: A universal ReRAM-based CNN accelerator with atomic layer computation." Proceedings of the 55th Annual Design Automation Conference. 2018. (Year: 2018).*

Luo, Changhang, Jietao Diao, and Changlin Chen. "FullReuse: A novel ReRAM-based CNN accelerator reusing data in multiple levels." 2020 IEEE 5th International Conference on Integrated Circuits and Microsystems (ICICM). IEEE, 2020. (Year: 2020).*

Simone Bianco et al., Benchmark Analysis of Representative Deep Neural Network Architectures, IEEE Access, Oct. 24, 2018, p. 64270-64277, vol. 6.

Leibin Ni et al., An Energy-efficient Matrix Multiplication Accelerator by Distributed In-memory Computing on Binary RRAM Crossbar, 2016, p. 280-285, IEEE.

Xiaochen Peng et al., Optimizing Weight Mapping and Data Flow for Convolutional Neural Networks on RRAM based Processing-In-Memory Architecture, 2019, IEEE.

Sparsh Mittal, A Survey of ReRAM-Based Architectures for Processing-In-Memory and Neural Networks, Machine Learning and Knowledge Extraction, Apr. 30, 2018, p. 75-114, MDPI.

Xiaochen Peng et al., User Manual of DNN+NeuroSim Framework V1.1, Dec. 1, 2019, p. 1-23.

Ali Shafiee et al., ISAAC: A Convolutional Neural Network Accelerator with In-Situ Analog Arithmetic in Crossbars, Annual International Symposium on Computer Architecture, Jun. 18, 2016, pp. 14-26, IEEE Computer Society.

Office Action for Korean Patent Application No. 10-2021-0116331 issued by the Korean Patent Office on Apr. 8, 2025.

Ananda Samajdar et al., Scale-Sim: Systolic CNN Accelerator Simulator, Feb. 2, 2019, pp. 1-11, arXiv.

Office Action for Korean Patent Application No. 10-2021-0116331 issued by the Korean Patent Office on Dec. 23, 2025.

Zhang Junyang et al., Design and implementation of two-dimensional matrix convolution based on vector processor, Journal of National University of Defense Technology, Jun. 2018, pp. 69-75, vol. 40 No. 3.

Notice of Allowance for Chinese Patent Application No. 202210732542.2 issued by the Chinese Patent Office on Sep. 17, 2025.

* cited by examiner

FIG. 7

$$W = \begin{bmatrix} W1 & W3 \\ W2 & W4 \end{bmatrix}$$

$$IFM = \begin{bmatrix} 1 & 2 & 3 & 4 & 5 & 6 & 7 & 8 \\ 9 & 10 & 11 & 12 & 13 & 14 & 15 & 16 \\ 17 & 18 & 19 & 20 & 21 & 22 & 23 & 24 \\ 25 & 26 & 27 & 28 & 29 & 30 & 31 & 32 \\ 33 & 34 & 35 & 36 & 37 & 38 & 39 & 40 \\ 41 & 42 & 43 & 44 & 45 & 46 & 47 & 48 \\ 49 & 50 & 51 & 52 & 53 & 54 & 55 & 56 \\ 57 & 58 & 59 & 60 & 61 & 62 & 63 & 64 \end{bmatrix}$$

FIG. 9

| | | Element using in each of Convolution Cycle | | | | | | | | | | | | | | | | PIBUF Update Count | | | | | |
|---|---|---|---|---|---|---|---|---|---|---|---|---|---|---|---|---|---|---|---|---|---|---|---|
| Time | SAidx | PE1 | | | | PE2 | | | | PE3 | | | | PE4 | | | | PE1 | PE2 | PE3 | PE4 | Total | GBUF read |
| 0 | 0 | 1 | | | | 9 | | | | 2 | | | | 10 | | | | 1 | 1 | 1 | 1 | 4 | 4 |
| 1 | 1 | | 3 | | | | 11 | | | 2 | | | | 10 | | | | 1 | 1 | 0 | 0 | 2 | 2 |
| 2 | 2 | | 3 | | | | 11 | | | | 4 | | | | 12 | | | 0 | 0 | 1 | 1 | 2 | 2 |
| 3 | 3 | | | 5 | | | | 13 | | | 4 | | | | 12 | | | 1 | 1 | 0 | 0 | 2 | 2 |
| 4 | 4 | | | 5 | | | | 13 | | | | 6 | | | | 14 | | 0 | 0 | 1 | 1 | 2 | 2 |
| 5 | 5 | | | | 7 | | | | 15 | | | 6 | | | | 14 | | 1 | 1 | 0 | 0 | 2 | 2 |
| 6 | 6 | | | | 7 | | | | 15 | | | | 8 | | | | 16 | 0 | 0 | 1 | 1 | 2 | 2 |
| 7 | 7 | 9 | | | | 17 | | | | 10 | | | | 18 | | | | 1 | 1 | 1 | 1 | 4 | 4 |
| 8 | 8 | | 11 | | | | 19 | | | 10 | | | | 18 | | | | 1 | 1 | 0 | 0 | 2 | 2 |
| 9 | 9 | | 11 | | | | 19 | | | | 12 | | | | 20 | | | 0 | 0 | 1 | 1 | 2 | 2 |
| 10 | 10 | | | 13 | | | | 21 | | | 12 | | | | 20 | | | 1 | 1 | 0 | 0 | 2 | 2 |
| 11 | 11 | | | 13 | | | | 21 | | | | 14 | | | | 22 | | 0 | 0 | 1 | 1 | 2 | 2 |
| 12 | 12 | | | | 15 | | | | 23 | | | 14 | | | | 22 | | 1 | 1 | 0 | 0 | 2 | 2 |
| 13 | 13 | | | | 15 | | | | 23 | | | | 16 | | | | 24 | 0 | 0 | 1 | 1 | 2 | 2 |
| 14~20 | | | | | | | | | | | | | | | | | | | | | | 16 | 16 |
| 21~27 | | | | | | | | | | | | | | | | | | | | | | 16 | 16 |
| 28~34 | | | | | | | | | | | | | | | | | | | | | | 16 | 16 |
| 35~41 | | | | | | | | | | | | | | | | | | | | | | 16 | 16 |
| 42~48 | | | | | | | | | | | | | | | | | | | | | | 16 | 16 |
| | | | | | | | | | | | | | | | | | | | | | | 112 | 112 |

FIG. 10

| | | Element using in each of Convolution Cycle | | | | | | | | | | | | | | | | PIBUF Update Count | | | | | |
|---|---|---|---|---|---|---|---|---|---|---|---|---|---|---|---|---|---|---|---|---|---|---|---|
| Time | SAidx | PE1 | | | | PE2 | | | | PE3 | | | | PE4 | | | | PE1 | PE2 | PE3 | PE4 | Total | GBUF read |
| 0 | 0 | 1 | | | | 9 | | | | 2 | | | | 10 | | | | 1 | 1 | 1 | 1 | 4 | 4 |
| 1 | 1 | | 3 | | | 9 | 11 | | | 2 | | | | 10 | | | | 1 | 1 | 0 | 0 | 2 | 2 |
| 2 | 2 | | 3 | | | 9 | 11 | | | | 4 | | | 10 | 12 | | | 0 | 0 | 1 | 1 | 2 | 2 |
| 3 | 3 | | | 5 | | 9 | 11 | 13 | | | 4 | | | 10 | 12 | | | 1 | 1 | 0 | 0 | 2 | 2 |
| 4 | 4 | | | 5 | | 9 | 11 | 13 | | | | 6 | | 10 | 12 | 14 | | 0 | 0 | 1 | 1 | 2 | 2 |
| 5 | 5 | | | | 7 | 9 | 11 | 13 | 15 | | | 6 | | 10 | 12 | 14 | | 1 | 1 | 0 | 0 | 2 | 2 |
| 6 | 6 | | | | 7 | 9 | 11 | 13 | 15 | | | | 8 | 10 | 12 | 14 | 16 | 0 | 0 | 1 | 1 | 2 | 2 |
| 7 | 7 | 17 | | | | 9 | 11 | 13 | 15 | 18 | | | | 10 | 12 | 14 | 16 | 1 | 0 | 1 | 0 | 2 | 2 |
| 8 | 8 | 17 | 19 | | | | 11 | 13 | 15 | 18 | | | | 10 | 12 | 14 | 16 | 1 | 0 | 0 | 0 | 1 | 1 |
| 9 | 9 | 17 | 19 | | | | 11 | 13 | 15 | 18 | 20 | | | | 12 | 14 | 16 | 0 | 0 | 1 | 0 | 1 | 1 |
| 10 | 10 | 17 | 19 | 21 | | | | 13 | 15 | 18 | 20 | | | | 12 | 14 | 16 | 1 | 0 | 0 | 0 | 1 | 1 |
| 11 | 11 | 17 | 19 | 21 | | | | 13 | 15 | 18 | 20 | 22 | | | | 14 | 16 | 0 | 0 | 1 | 0 | 1 | 1 |
| 12 | 12 | 17 | 19 | 21 | 23 | | | | 15 | 18 | 20 | 22 | | | | 14 | 16 | 1 | 0 | 0 | 0 | 1 | 1 |
| 13 | 13 | 17 | 19 | 21 | 23 | | | | 15 | 18 | 20 | 22 | 24 | | | | 16 | 0 | 0 | 1 | 0 | 1 | 1 |
| 14~20 | | | | | | | | | | | | | | | | | | | | | | 8 | 8 |
| 21~27 | | | | | | | | | | | | | | | | | | | | | | 8 | 8 |
| 28~34 | | | | | | | | | | | | | | | | | | | | | | 8 | 8 |
| 35~41 | | | | | | | | | | | | | | | | | | | | | | 8 | 8 |
| 42~48 | | | | | | | | | | | | | | | | | | | | | | 8 | 8 |
| | | | | | | | | | | | | | | | | | | | | | | 64 | 64 |

DATA PROCESSING SYSTEM, OPERATING METHOD THEREOF, AND COMPUTING SYSTEM USING THE SAME

CROSS-REFERENCES TO RELATED APPLICATION

The present application claims priority under 35 U.S.C. § 119(a) to Korean Patent Application Number 10-2021-0116331, filed on Sep. 1, 2021, which is incorporated herein by reference in its entirety.

BACKGROUND

1. Technical Field

Various embodiments of the present disclosure may generally relate to data processing technology, and more particularly, to a data processing system for a neural network operation, an operating method thereof, and a computing system using the same.

2. Related Art

As the interest and importance in artificial intelligence applications and big data analysis are increased, demands for computing systems capable of efficiently processing massive data have been increasingly increased.

An artificial neural network is one way to implement artificial intelligence. The goal of the artificial neural network is to increase problem solving ability of a machine, that is, reasoning power through learning. However, as accuracy of an output is increased, the amount of computation, the number of memory accesses, and the amount of data movement may be increased.

This may cause reduction in speed, power consumption, and the like, and thus system performance may be deteriorated.

SUMMARY

In an embodiment of the present disclosure, a data processing system may include: a controller configured to receive a neural network operation processing request from a host device; and an in-memory computing device including a plurality of processing elements. The in-memory computing device is configured to receive an input feature map and a weight filter from the controller, and perform a neural network operation in the plurality of processing elements based on the weight filter and a plurality of division maps generated from the input feature map, wherein the in-memory computing device performs the neural network operation by not moving a reused element, which is operated at least twice among elements constituting the division maps during the neural network operation, between the processing elements.

In an embodiment of the present disclosure, a data processing system may include: a global buffer in which an input feature map and a weight filter are stored; a computing memory including a plurality of processing elements and configured to perform a plurality of cycles of a neural network operation by receiving the weight filter and a plurality of division maps generated from the input feature map; and a scheduler configured to: select processing elements corresponding to a number of elements of the weight filter among the plurality of processing elements, store all elements of the weight filter in the selected processing elements, and distribute and store elements of the respective division maps in the selected processing elements, wherein the scheduler distributes and stores the elements of the respective division maps by allowing a reused element, which is operated at least twice among the elements of the division maps during the neural network operation, to be retained in a corresponding single processing element, to which the reused element is initially provided among the plurality of processing elements.

In an embodiment of the present disclosure, an operating method of a data processing system may include: receiving, by a controller, a neural network operation processing request from a host device; receiving, by an in-memory computing device including a plurality of processing elements, an input feature map and a weight filter from the controller; generating, by the in-memory computing device, a plurality of division maps from the input feature map; and performing, by the in-memory computing device, a neural network operation through at least partial processing elements among the plurality of processing elements based on the plurality of division maps and the weight filter, wherein the performing of the neural network operation includes controlling a reused element, which is operated at least twice among elements constituting the division maps during the neural network operation, not to be moved between the processing elements.

In an embodiment of the present disclosure, a computing system may include: a host device; and a data processing system. The data processing system is configured to generate a plurality of division maps from an input feature map in response to a neural network operation processing request from the host device, and perform a neural network operation in a plurality of processing elements based on a weight filter and the plurality of division maps, wherein the data processing system performs the neural network operation by not moving a reused element, which is operated at least twice among elements constituting the division maps during the neural network operation, between the processing elements.

In an embodiment of the present disclosure, an in-memory computing device comprising: processing elements (PEs) configured to perform a convolution operation on a filter and a division map at each cycle, each PE being configured to perform the convolution operation on an assigned filter element and an assigned map element; and a control unit configured to: assign filter elements from the filter to the respective PEs, divide an input map into division maps such that partial map elements are shared by two of the division maps, and assign, at each cycle, map elements from a selected division map to the respective PEs, wherein the control unit is further configured to control a selected PE to perform the convolution operation on a re-cycled map element without assigning again the re-cycled map element to the selected PE, at a current cycle, and wherein the control unit assigns the re-cycled map element to the selected PE at a previous cycle.

These and other features, aspects, and embodiments are described in more detail below.

BRIEF DESCRIPTION OF THE DRAWINGS

The above and other aspects, features and advantages of the subject matter of the present disclosure will be more clearly understood from the following detailed description taken in conjunction with the accompanying drawings, in which:

FIGS. 7 to 10 are diagrams for describing a data reuse concept according to an embodiment of the present disclosure.

DETAILED DESCRIPTION

Various embodiments of the present disclosure are described in detail with reference to the accompanying drawings. The drawings are schematic illustrations of various embodiments (and intermediate structures). As such, variations from the configurations and shapes of the illustrations as a result, for example, of manufacturing techniques and/or tolerances, are to be expected. Thus, the described embodiments should not be construed as being limited to the particular configurations and shapes illustrated herein but may include deviations in configurations and shapes which do not depart from the spirit and scope of the present disclosure as defined in the appended claims.

Various embodiments of the present disclosure are described herein with reference to cross-section and/or plan illustrations of the embodiments. However, embodiments of the present disclosure should not be construed as limiting the present disclosure. Although a few embodiments of the present disclosure are shown and described, it will be appreciated by those of ordinary skill in the art that changes may be made in these embodiments without departing from the principles and spirit of the present disclosure.

Figure 1:
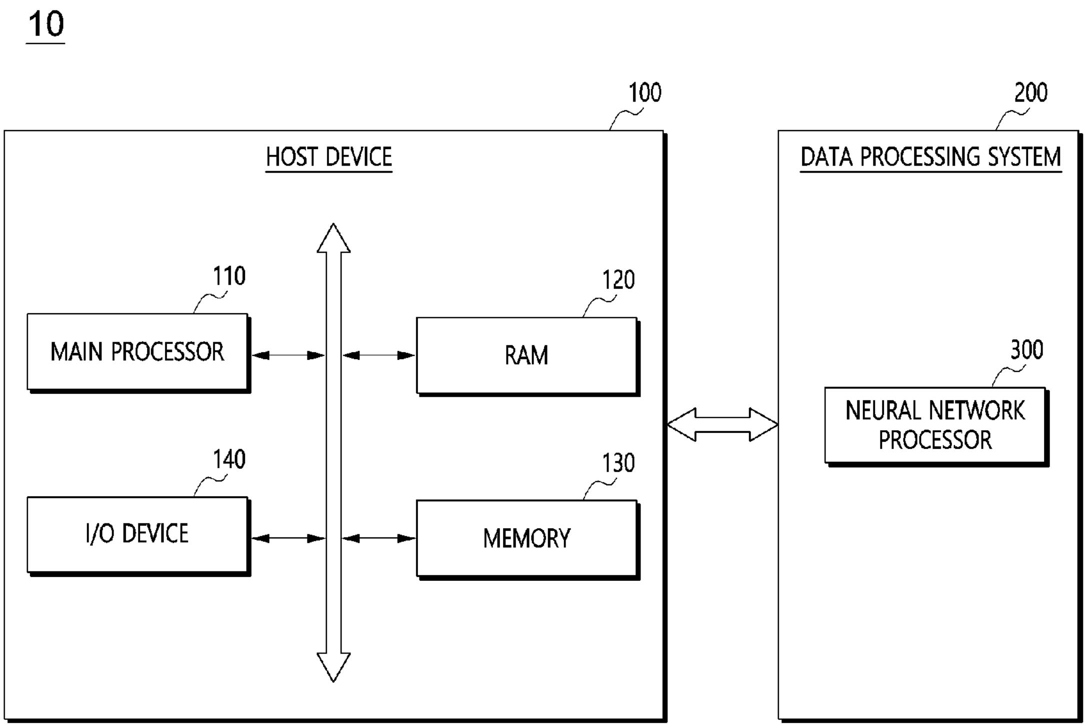
FIG. 1 is a diagram illustrating a configuration of a computing system according to an embodiment of the present disclosure.

FIG. 1 is a diagram illustrating a computing system according to an embodiment of the present disclosure.

A computing system 10 may include a host device 100 and a data processing system 200 configured to perform operation processing for applications requested by the host device 100.

The host device 100 may include at least an intellectual property (IP) block such as a main processor 110, a random access memory (RAM) 120, a memory 130, an input/output (I/O) device (140), and the like. The host device may further include general-purposed elements (not shown).

In the embodiment, the host device 100 may be implemented as a system on chip (SoC) in which the elements of the host device 100 are integrated in one semiconductor chip, but this is not limited thereto. The elements of the host device 100 may be implemented by a plurality of semiconductor chips.

The main processor 110 may control an overall operation of the computing system 10 and for example, may be a central processing unit (CPU). The main processor 110 may include one or a plurality of cores. The main processor 110 may process or execute programs, data, and/or instructions stored in the RAM 120 and the memory 130. For example, the main processor 110 may control functions of the computing system 10 by executing the programs stored in the memory 130.

The RAM 120 may temporarily store programs, data, or commands. Programs and/or data stored in the memory 130 may be temporarily loaded into the RAM 120 according to control of the main processor 110 or a booting code. The RAM 120 may be implemented using a memory such as a dynamic RAM (DRAM) or a static RAM (SRAM).

The memory 130 may be a storage site for storing data, and for example, the memory 130 may store an operating system (OS) and various types of programs and data. The memory 130 may include at least one of a volatile memory and a nonvolatile memory. The nonvolatile memory may be selected from among a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), and a ferroelectric RAM (FRAM). The volatile memory may be selected from among a dynamic RAM (DRAM), a static RAM (SRAM), and a synchronous DRAM (SDRAM). In an embodiment, the memory 130 may be implemented as a hard disk drive (HDD), a solid-state drive (SDD), a compact flash (CF), a secure digital (SD), a micro secure digital (Micro-SD), a mini secure digital (Mini-SD), an extreme digital (xD), or a memory stick.

The I/O device 140 may receive a user input or input data from the outside and output a data processing result of the computing system 10. The I/O device 140 may be implemented as a touch screen panel, a keyboard, various types of sensors, and the like. In an embodiment, the I/O device 140 may collect sounding information of the computing system 10. For example, the I/O device 140 may include an imaging device and an image sensor, and the I/O device 140 may sense or receive an image signal from the outside of the data processing system 200, convert the sensed or received image signal to image data, and store the image data in the memory 130 or provide the image data to the data processing system 200.

In response to a request of the host device 100, the data processing system 200 may extract valid information by analyzing input data based on an artificial neural network, and based on the extracted information, determine a status or control elements of an electronic device mounted with the data processing system 200. For example, the data processing system 200 may be applied to a drone, an advanced driver assistance system (ADAS), a smart television (TV), a smart phone, a medical device, a mobile device, an image display device, a measuring device, an Internet of things (IOT) device, and the like. In addition, the data processing system 200 may be mounted on one of various types of computing systems 10.

In an embodiment, the host device 100 may offload the neural network operation into the data processing system 200, and the host device 100 may provide an initial parameter for the neural network operation, for example, input data and a weight to the data processing system 200.

In an embodiment, the data processing system 200 may be an application processor mounted on a mobile device.

The data processing system 200 may include at least a neural network processor 300.

The neural network processor 300 may generate a neural network model by training or learning input data, generate an information signal by computing the input data according to the neural network model, or retrain the neural network model. The neural network may include various types of neural network models such as a convolution neural network (CNN), a region with convolution neural network (R-CNN), a region proposal network (RPN), a recurrent neural network (RNN), a stacking-based deep neural network (S-DNN), a state-space dynamic neural network (S-SDNN), a deconvolution network, a deep belief network (DBN), a restricted Boltzmann machine (RBM), a fully convolutional network, a long short-term memory (LSTM) network, and a classification network, but this is not limited thereto.

Figure 2:
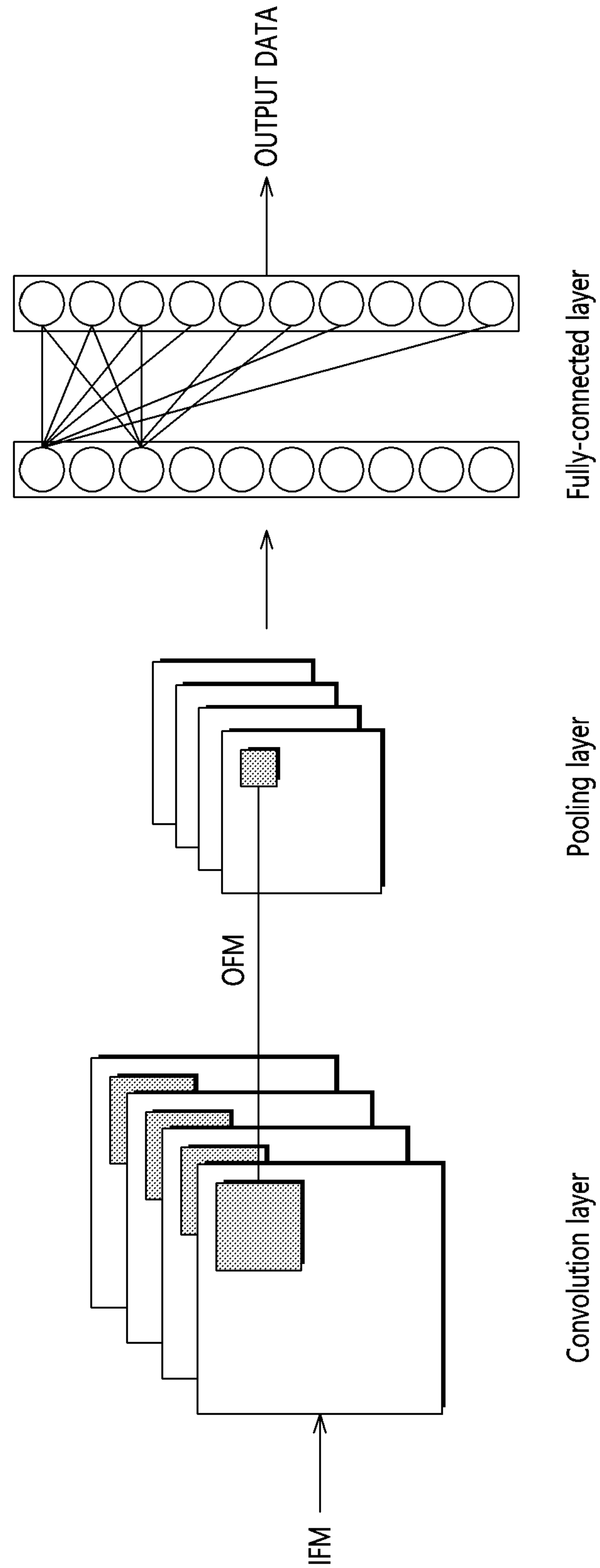
FIG. 2 is a diagram for describing a data processing concept of an artificial neural network according to an embodiment of the present disclosure.

FIG. 2 is a diagram for describing a data processing concept of an artificial neural network according to an embodiment of the present disclosure. FIG. 2 illustrates a data processing concept of a CNN.

The CNN may be configured of a convolution layer, a pooling layer, and a fully connected layer.

The convolution layer may generate an output feature map OFM by applying a weight filter (kernel) W to an input feature map IFM.

The pooling layer may be a layer which adds spatial invariance to a feature extracted through the convolution layer and may function to reduce the output of the convolution layer.

The convolution layer and the pooling layer may reduce complexity of the overall model by considerably reducing parameters of a neural network.

The fully connected layer may generate output data by classifying input data according to a feature extraction result output from the pooling layer.

Figure 3:
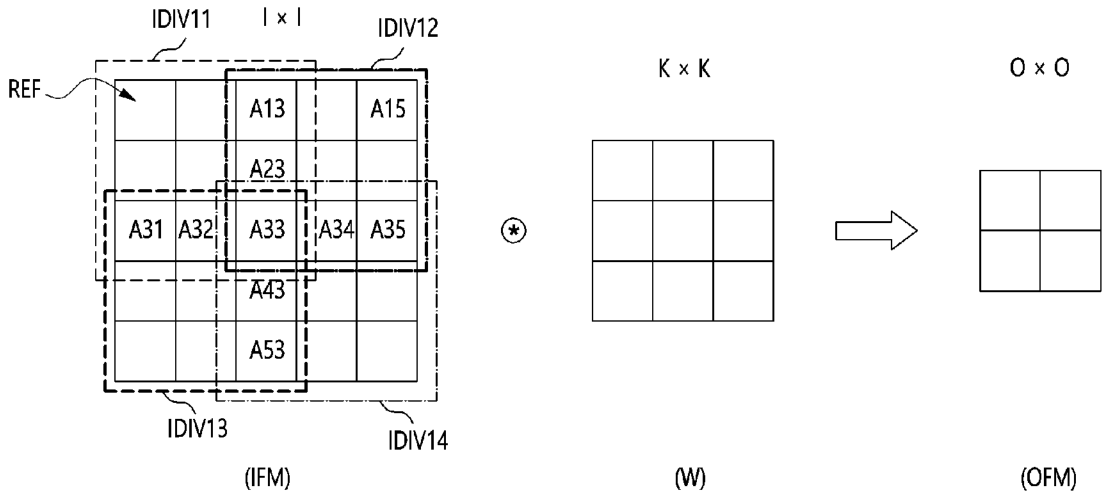
FIG. 3 is a diagram for describing an operation concept of a convolution layer according to an embodiment of the present disclosure.

FIG. 3 is a diagram for describing an operation concept of the convolution layer according to an embodiment of the present disclosure.

The input feature map IFM and the weight filter W may be provided in a matrix form. Unless specifically described hereinafter, it should be understood that the input feature map IFM and the weight filter W may be matrixes having set dimensions (row*column) or set sizes.

To apply the weight filter W to the input feature map IFM, the input feature map IFM may be divided into a plurality of division maps IDIV11, IDIV12, IDIV13, and IDIV14 each having the same dimension as the weight filter W. For example, as a convolution window having the same dimension as the weight filter W slides at a fixed interval (i.e., a stride) using a reference element REF located in the first row and the first column in the input feature map IFM, the input feature map IFM may be divided into the plurality of division maps IDIV11, IDIV12, IDIV13, and IDIV14, and the weight filter W may be sequentially applied to the division maps IDIV11, IDIV12, IDIV13, and IDIV14. Accordingly, the output feature map OFM may be calculated by performing a multiply and accumulation (MAC) operation on elements of the division maps IDIV11, IDIV12, IDIV13, and IDIV14 and elements of the weight filter W.

It is illustrated in FIG. 3 that a size of the input feature map IFM is I*I (where I=5), a size of the weight filter W is K*K (where K=3), and a stride is 2. The number of division maps IDIV11, IDIV12, IDIV13, and IDIV14 may be determined as (I−K)*(I−K). The output feature map OFM having a O*O (where 0=I−K) size may be obtained by performing a convolution operation on the weight filter W and the respective division maps IDIV11, IDIV12, IDIV13, and IDIV14 through convolution cycles in order to perform the convolution operation on the input feature map IFM. Therefore, a number of the convolution cycles may be the same as the number of division maps IDIV11, IDIV12, IDIV13, and IDIV14.

The convolution operation may be performed by sliding the convolution window by the stride to a row direction or a column direction, starting with a first convolution cycle that the weight filter W is applied to the first division map IDIV11 including the reference element REF. For example, when the convolution operation for the division map IDIV12 including the last row-wise element A15 is performed by sliding the convolution window in the row direction, the convolution window may be slid in the column direction. Then, through the repetitive process of performing the convolution operation by sliding the convolution window in the row direction again, the convolution operation on all the division maps IDIV11, IDIV12, IDIV13, and IDIV14 and the weight filter W may be performed and thus the output feature map OFM may be acquired.

It can be seen from FIG. 3 that, when the weight filter W is applied to each of the division maps IDIV11, IDIV12, IDIV13, and IDIV14 of the input feature map IFM, the weight filter W is repeatedly used every convolution cycle, and at least partial elements of the division maps IDIV11, IDIV12, IDIV13, and IDIV14 are reused.

For example, when the convolution operation on the first division map IDIV11 and the weight filter W is performed in the first convolution cycle and then the convolution operation on the second division map IDIV12 and the weight filter W is performed in the second convolution cycle, elements A13, A23, and A33 used in the first convolution cycle may be reused.

When a convolution operation on the third division map IDIV13 and the weight filter W is performed in a third convolution cycle, the elements A31, A32, and A33 used in the first convolution cycle and the element A33 used in the second convolution cycle may be reused.

When a convolution operation on the fourth division map IDIV14 and the weight filter W is performed in a fourth convolution cycle, elements A33, A34, and A35 used in the second convolution cycle and the elements A33, A43, and A53 used in the third convolution cycle may be reused.

The data used in the convolution operation, for example, the weight filter W and the input feature map IFM may be provided to processing elements PE from an external buffer. Detailed description for the external buffer and the processing elements PE will be made in detail later.

In an embodiment, the convolution operation for the elements of the division maps IDIV11, IDIV12, IDIV13, and IDIV14 may be processed in the processing elements PE independent of each other. In the embodiment, it is difficult to guarantee power consumption and latency characteristics when the elements, which are to be reused in the following convolution cycle among the elements used in a previous convolution cycle, are input again from the external buffer to the processing element PE or are moved between the processing elements PE.

Therefore, a method for minimizing a movement amount of data reused in the convolution cycles is disclosed in the present disclosure.

Figure 4:
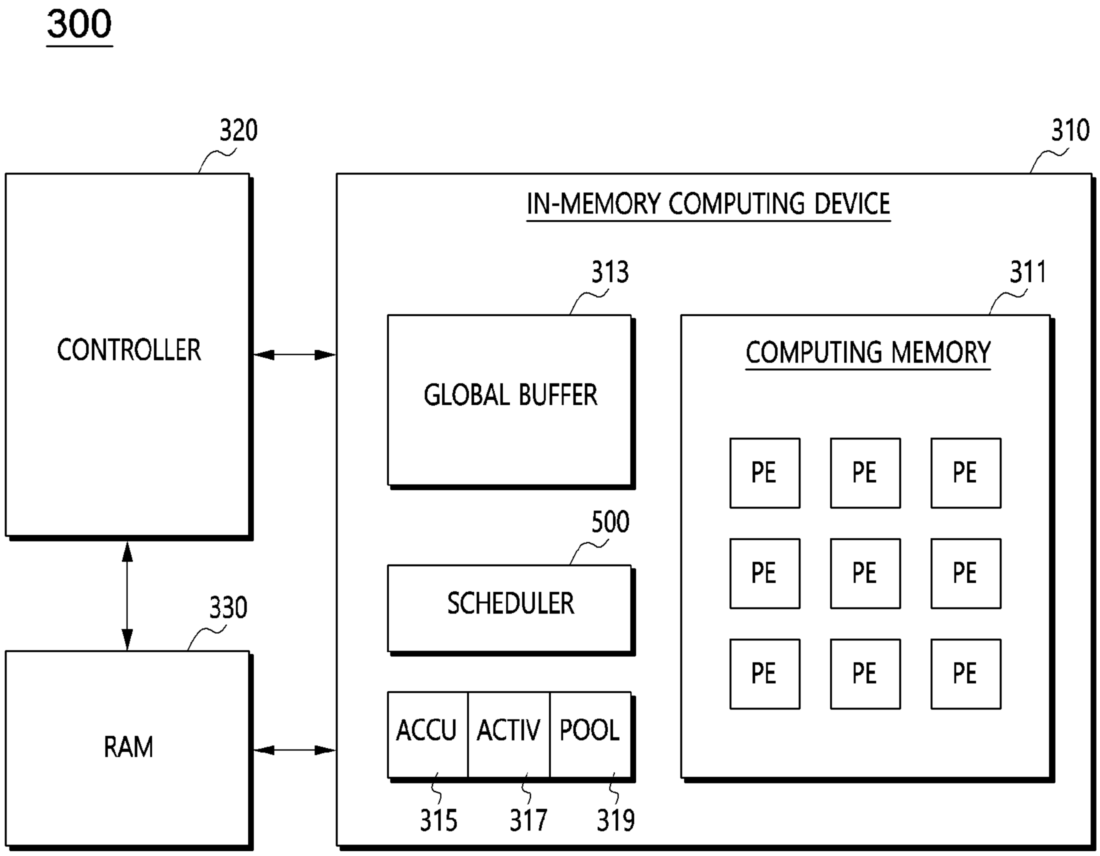
FIG. 4 is a diagram illustrating a configuration of a neural network processor according to an embodiment of the present disclosure.

FIG. 4 is a diagram illustrating a configuration of a neural network processor according to an embodiment of the present disclosure.

Referring to FIG. 4, the neural network processor 300 may be a neural network operation-specialized processor or accelerator, and may include an in-memory computing device 310, a controller 320, and a RAM 330. In an embodiment, the neural network processor 300 may be implemented as a system on chip SOC integrated in one semiconductor chip, but this is not limited thereto. The neural network processor 300 may be implemented with a plurality of semiconductor chips.

The controller 320 may control an overall operation of the neural network processor 300. The controller 320 may set and manage parameters related to the neural network operation to allow the in-memory computing device 310 to normally execute the neural network operation. The controller 320 may be implemented with hardware, software (or firmware), or a combination of hardware and software.

The controller 320 may be implemented with at least one processor, for example, a central processing unit (CPU), a microprocessor, and the like, and may execute instructions constituting various functions stored in the RAM 330.

The RAM 330 may be implemented with DRAM, SRAM, and the like, and the RAM 330 may store various types of programs and data for operations of the controller 320, and data generated in the controller 320.

The in-memory computing device 310 may be configured to perform a neural network operation according to control of the controller 320. The in-memory computing device 310 may include a computing memory 311, a global buffer 313, an accumulator (ACCU) 315, an activator (ACTIV) 317, a pooler (POOL) 319, and a scheduler 500.

The computing memory 311 may include a plurality of processing elements PE. Each of the processing elements PE may perform a convolution operation on an element of the input feature map IFM and an element of the weight filter W provided from the global buffer 313. For example, each of the processing elements PE may perform a multiply and accumulation (MAC) operation on the element of the division maps in the input feature map IFM and the element of the weight filter W.

The global buffer 313 may store the input feature map IFM and the weight filter W and provide the stored input feature map IFM and stored filter W to the computing memory 311. The global buffer 313 may receive an operation result from the computing memory 311 and store the received operation result therein. The global buffer 313 may be implemented with DRAM, SRAM, and the like.

The accumulator 315 may be configured to derive a weighted sum by accumulating processing results of the processing elements PE.

The activator 317 may be configured to add nonlinearity by applying the weighted sum result of the accumulator 315 to an activation function such as a rectified linear unit (ReLU).

The pooler 315 may reduce and optimize a dimension by sampling an output value of the activator 317.

The processing process through the computing memory 311, the accumulator 315, the activator 317, and the pooler 319 may be a process of learning or relearning the neural network model or a process of inferring input data.

In the process of learning or inferring the neural network model, data movement from the global buffer 313 to the computing memory 311 and data movement between the processing elements PE in the computing memory 311 may cause an increase in power consumption and degradation in data processing speed.

The scheduler 500 according to the present disclosure may be configured to schedule a transfer method of the weight filter W and the input feature map IFM to be used in the processing elements PE to minimize the data movement in the data processing process of the computing memory 311.

Figure 5:
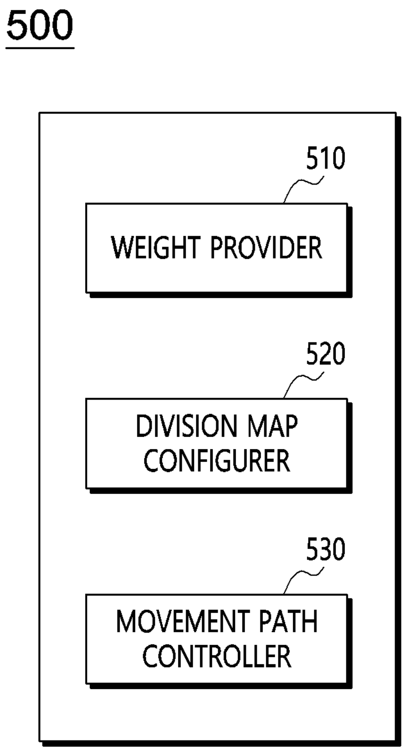
FIG. 5 is a diagram illustrating a configuration of a scheduler according to an embodiment of the present disclosure.

FIG. 5 is a diagram illustrating a scheduler according to an embodiment of the present disclosure.

Referring to FIG. 5, the scheduler 500 according to an embodiment may include a weight filter provider 510, a division map configurer 520, and a movement path controller 530.

To simultaneously perform the convolution operation on elements of each division map IDIV and elements of the weight filter W independently in each unit convolution cycle, the processing elements PE, a number of which is the same as the number of elements of the division map IDIV or the number of elements of the weight filter W, may be required.

The weight filter provider 510 may select the processing elements PE by the number required in every convolution cycle, and provide all elements of the weight filter W to the selected processing elements PE. Accordingly, all elements of the weight filter W may be stored in the selected processing elements PE.

The division map configurer 520 may divide the input feature map IFM into a plurality of division maps IDIV each having the same size as the weight filter W. In an embodiment, the division map configurer 520 may acquire the plurality of division maps IDIV by sliding the convolution window having the same size as the weight filter W at a fixed interval (stride) using the reference element located at the first row and the first column in the input feature map IFM. As the input feature map IFM is divided into the plurality of division maps IDIV, the convolution operation may be performed by the convolution cycles, a number of which is the same as the number of division maps IDIV.

The movement path controller 530 may be configured to provide the elements of the division map IDIV to the computing memory 311 while the convolution cycles are sequentially performed in the computing memory 311. The elements of the division map IDIV used in every convolution cycle may be distributed and provided to the plurality of processing elements PE selected through the weight filter provider 510 without overlapping.

In particular, the movement path controller 530 may be configured to provide new elements to be initially used in the computing memory 311, for example, elements having no transfer history to the computing memory 311 from the global buffer 313 to the computing memory 311.

Further, the movement path controller 530 may control reused elements to be reused in the computing memory 311, for example, elements having transfer history from the global buffer 313 to the computing memory 311 not to be transferred from the global buffer 313 to the computing memory 311 and may also control the reused elements not to be transferred between the processing elements PE in the computing memory 311. Accordingly, the reused elements may be operated in a state that the reused elements are retained in the processing elements in which the reused elements are previously used.

Elements of the division map IDIV to be used in a specific convolution cycle may include only new elements or only reused elements. Further, the elements of the division map IDIV to be used in the specific convolution cycle may include all of the new elements and the reused elements.

The movement path controller 530 according to the present disclosure may determine a reused state (reuse/non-reuse and reuse cycle) of each of the elements of the division maps IDIV while the convolution cycle progresses. Based on the determination result, the movement path controller 530 may control the reused elements to be operated in a processing element PE in which the reused elements are operated in a previous cycle or in a processing element PE in which the reused elements are initially operated, so that the movement amount of the reused elements may be minimized.

In an embodiment, the movement path controller 530 may control the movement path of the element to be reused when the convolution window slides in a row direction and/or the movement path of the element to be reused when the convolution window slides in a column direction. The reused element is an element that overlapping between the plurality of division maps IDIV generated by moving the input feature map in the row and/or column direction according to the convolution window, and has been calculated with the weight filter W in the previous convolution cycle.

For example, the movement path controller 530 may control only the elements, which are to be reused in the row direction, to be retained in the processing elements PE in which the elements are used in the previous cycle, and then to be reused in the following cycle. Further, the movement path controller 530 may control only the elements, which are to be reused in the column direction, to be retained in the processing elements PE in which the elements are used in the previous cycle, and then to be reused in the following cycle. In another example, the movement path controller 530 may control all elements, which are to be reused in the row and column directions, to be reused in the processing elements PE, in which the elements are used in the previous cycle, in the following cycle.

Figure 6:
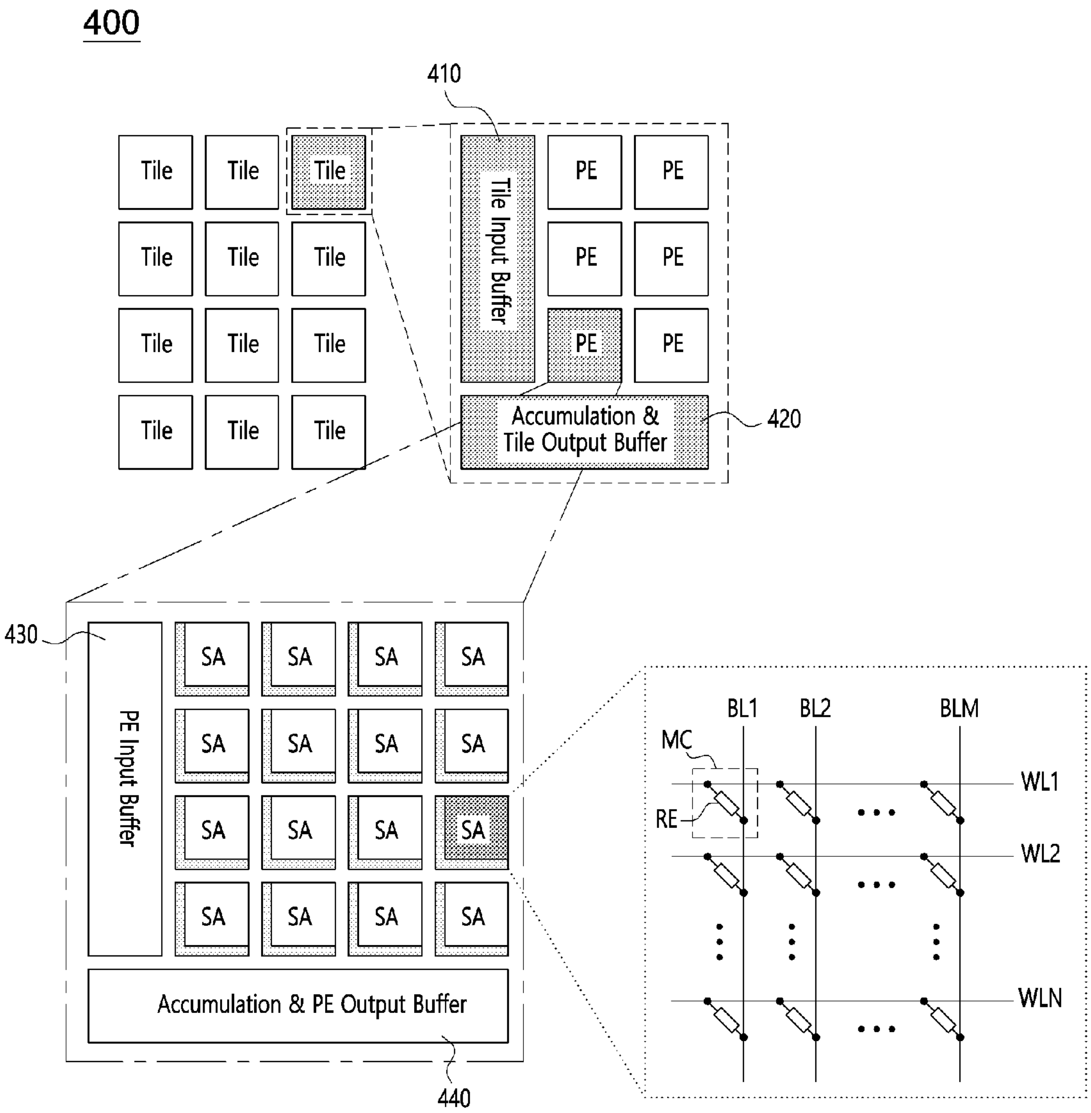
FIG. 6 is a diagram illustrating a configuration of a computing memory according to an embodiment of the present disclosure.

FIG. 6 is a diagram illustrating a configuration of a computing memory according to an embodiment of the present disclosure.

Referring to FIG. 6, a computing memory 400 according to an embodiment may include a plurality of tiles Tiles.

Each of the plurality of tiles Tiles may include a tile input buffer 410, a plurality of processing elements PE, and a tile output buffer 420.

Each of the plurality of processing elements PE may include a PE input buffer 430, a plurality of sub arrays SA, and an accumulation and PE output buffer 440.

The sub array SA may refer to a synapse array, and may include a plurality of word lines WL1, WL2, . . . , WLN, a plurality of bit lines BL1, BL2, . . . , BLM, and a plurality of memory cells MC. In an embodiment, the memory cells MC may include resistive memory devices RE, specifically, memristor devices, but this is not limited thereto. Values of data to be stored in the memory cells MC may be changed by a write voltage applied through the plurality of word lines WL1 to WLN or the plurality of bit lines BL1 to BLM, and the resistive memory cells may store data through the resistance change.

In an embodiment, the resistive memory cell may be implemented to include a resistive memory cell such as a PRAM cell, a RRAM cell, a MRAM cell, and a FRAM cell.

The resistive device constituting the resistive memory cell may include a material of which a crystalline state is changed according to an amount of current, such as a phase-change material, a perovskite compound, a transition metal oxide, a magnetic material, a ferromagnetic material, or an antiferromagnetic material, but this is not limited thereto.

When a unit cell of the sub array SA is a memristor device, the processing element PE may store data corresponding to each element of the weight filter W in the memristor device, and may perform the convolution operation using Kirchhoff's law or Ohm's low by applying voltages corresponding to the elements of the division map IDIV to the word lines WL1 to WLN.

When the size of the convolution window is, for example, 2*2, four processing elements PE may be necessary to perform the convolution operation on the elements of the division map IDIV in each convolution cycle. The sub arrays SA included in the processing element PE may be activated at least partially based on the number of reuses of the reused elements and the size of the weight filter W.

For the convolution operation, the elements of the weight filter W may be stored in different sub arrays SA of all selected processing elements PE. The elements of the division map IDIV may be distributed and provided to the selected processing elements PE. For example, the elements of the division map IDIV to be operated in one convolution cycle may be stored in different processing elements PE from each other. In this example, the new element of the division map IDIV may be transferred to the processing element PE from the global buffer 313, and the convolution operation may be performed in a state that the reused element is retained in a processing element PE in which the reused element is used in a previous convolution cycle. Accordingly, the new element of the specific convolution cycle may be stored in the processing element PE in which the reused element is not stored. Further, each element of the division map IDIV may be provided to a sub array SA, in which the weight filter W to be operated with the element is stored, among the sub arrays SA in the selected processing element PE.

Accordingly, when performing the convolution operation, the processing element PE may not transfer an element of the division map IDIV generated from the input data to another processing element PE, and the processing element PE needs not to receive the element of the division map IDIV, which is input once thereto, from the global buffer 313.

The computing memory 400 illustrated in FIG. 6 may be merely an example, and any structure that may process the convolution operation for the element of the division map IDIV together with the weight filter W without the movement of the reused element of the division map IDIV between the processing elements PE may be employed.

FIGS. 7 to 10 are diagrams for describing a data reuse concept according to an embodiment of the present disclosure.

FIG. 7 illustrates the weight filter W and the input feature map IFM according to an embodiment.

It can be seen from FIG. 7 that the size of the weight filter W is 2*2 and the size of the input feature map IFM is 8*8.

When the convolution operation is performed on the weight filter W and the input feature map IFM with the stride having a value of 1 as illustrated in FIG. 7, the convolution operation may be completed through 49 convolution cycles for {(8-1)*(8-1)} division maps IDIV.

Figure 8:
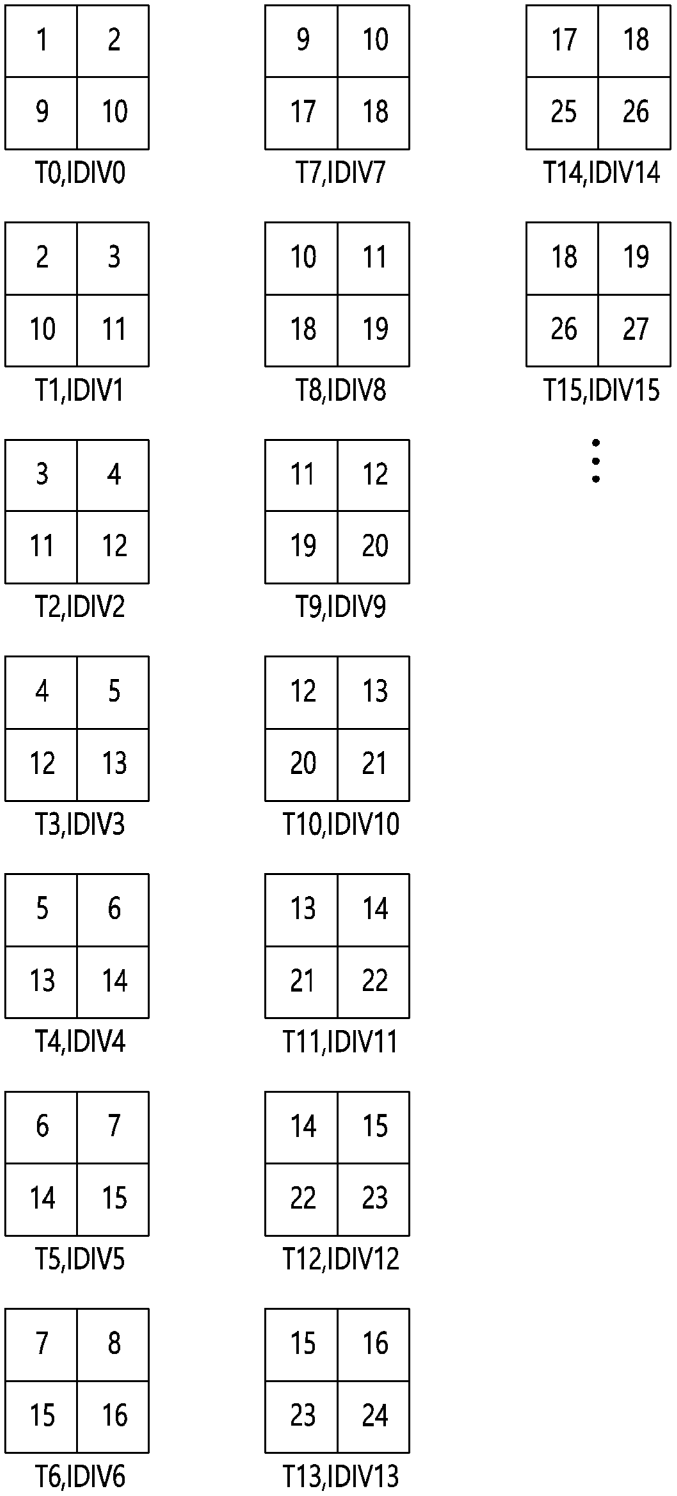

FIG. 8 illustrates partial division maps IDIV0 to IDIV13 of the input feature map IFM illustrated in FIG. 7.

The division maps IDIV0 to IDIV15 respectively used in from a first convolution cycle T0 to a sixteenth convolution cycle T15 among the 49 convolution cycles are illustrated in FIG. 8.

Elements "2" and "10" among elements of the first division map IDIV0 used in the first convolution cycle T0 may be reused in the second convolution cycle T1, and elements "3" and "11" among elements of the second division map IDIV1 used in the second convolution cycle T1 may be reused in the third convolution cycle T2. As described above, at least partial elements of the division maps (IDIV) may be reused while the convolution window moves to the row direction according to the stride.

FIG. 9 is a diagram for describing a data movement amount in a row-wise reuse method that the elements to be reused in the row direction has been retained in the processing element PE and then are reused in the following convolution cycle. Regarding FIG. 9, the field "time" means convolution cycle, the field "SAidx" means an identifier of sub arrays SA, "PIBUF" means the PE input buffer, and the field "GBUF" means the global buffer. The numbers in the cells in the 3rd to 18th columns from the left mean elements that are reused element in each convolution cycle, the numbers in the cells in the 19th to 22nd columns mean the number of times PE input buffer PIBUF is updated, the numbers in the cells in the 23rd column mean the total number of times that PE input buffer PIBUF of each PE 1, PE2, PE3 and PE4 are updated, and the number in the cell in the 24th column means the number of times the global buffer GBUF is read.

As illustrated in FIG. 6, each processing element PE may include the plurality of sub arrays SA. Elements of the weight filter W may be distributed and stored in different sub arrays SA of all processing elements PE1 to PE4 selected for the convolution operation.

Referring to FIGS. 8 and 9, since elements "1", "9", "2", and "10" of the first division map IDIV0 to be used in the first convolution cycle T0, time=0 are new elements, the new elements "1", "9", "2", and "10" may be stored in the first processing element PE1, the second processing element PE2, the third processing element PE3, and the fourth processing element PE4, from the global buffer GBUF (see 313 of FIG. 4 or 430 of FIG. 6). The new elements "1", "9", "2", and "10" may be distributed and provided to the selected first to fourth processing elements PE1 to PE4, respectively, wherein each of the new elements "1", "9", "2", and "10" may be stored in any of the sub arrays SA of the corresponding processing element PE.

Since elements "3" and "11" among elements "2", "10", "3", and "11" of the second division map IDIV1 to be used in the second convolution cycle T1, time=1 are new elements, the new elements "3" and "11" may be provided from the global buffer GBUF (see 313 of FIG. 4 or 430 of FIG. 6). Since the reused elements "2" and "10" have been already stored in the third processing element PE3 and the fourth processing element PE4, the reused element "2" and "10" need not to be provided from the global buffer GBUF or need not to be moved to other processing elements. The new elements "3" and "11" may be stored in the first processing element PE1 and the second processing element PE2 to be distributed from the reused elements.

Since elements "4" and "12" among elements "3", "11", "4", and "12" of the third division map IDIV2 to be used in the third convolution cycle T2, time=2 are new elements, the new elements "4" and "12" may be provided from the global buffer GBUF (see 313 of FIG. 4 or 430 of FIG. 6). Since the reused elements "3" and "11" have been already stored in the first processing element PE1 and the second processing element PE2, the reused element "3" and "11" need not be provided from the global buffer GBUF or need not be moved to other processing elements. The new elements "4" and "12" may be stored in the third processing element PE3 and the fourth processing element PE4.

After a seventh convolution cycle T6, time=6 is performed through the above-described repetitive process, the convolution window may move by a stride in the column direction, and then eighth to fourteenth convolution cycles T7 to T 13 may be performed on the eighth to fourteenth division maps IDIV7 to IDIV13 while the convolution window moves by the stride in the row direction again.

When the convolution operations are performed in a state that the elements to be reused in the row direction are retained in the processing elements PE in which the reused elements have been already stored during 49 convolution cycles, the data transfer count from the global buffer GBUF (see 313 of FIG. 4 or 430 of FIG. 6) and the update count of the PE input buffer "PIBUF" are 112 and 112, respectively.

In the convolution operation on the weight filter W and the input feature map IFM illustrated in FIG. 7 with the stride of "1", when the new elements are read from the global buffer GBUF (see 313 of FIG. 4 or 430 of FIG. 6) and the reused elements are transferred to other processing elements PE every convolution cycle, the data transfer count from the global buffer GBUF and the update count of the PE input buffer (see 313 of FIG. 4 or 430 of FIG. 6) are 112 and 196, respectively.

Accordingly, when the reused elements are not moved as in the present disclosure, the data movement amount may be considerably reduced.

FIG. 10 is a diagram for describing a data movement amount in a row-wise and column-wise reuse method that the elements to be reused in the row direction as well as in the column direction has been retained in the processing elements PE and then reused in the following convolution cycle in accordance with an embodiment of the present disclosure. Regarding FIG. 10, the field "time" means convolution cycle, the field "SAidx" means an identifier of sub arrays SA, "PIBUF" means the PE input buffer, and the field "GBUF" means the global buffer. The numbers in the cells in the 3rd to 18th columns from the left mean elements that are reused element in each convolution cycle, the numbers in the cells in the 19th to 22nd columns mean the number of times PE input buffer PIBUF is updated, the numbers in the cells in the 23rd column mean the total number of times that PE input buffer PIBUF of each PE 1, PE2, PE3 and PE4 are updated, and the number in the cell in the 24th column means the number of times the global buffer GBUF is read.

Referring to FIGS. 8 and 10, since elements "17" and "18" among elements "9", "17", "10", and "18" of the eighth division map IDIV7 to be used in the eighth convolution cycle T7, time=7, in which reuse of elements in the column direction occurs, are new elements, the new elements "17" and "18" may be provided from the global buffer GBUF (see 313 of FIG. 4 or 430 of FIG. 6). Since the reused elements "9" and "10" in the column direction have been already stored in the second processing element PE2 and the fourth processing element PE4 in the first convolution cycle T0, time=0, the new elements "17" and "18" in the eighth convolution cycle T7, time=7 may be stored in the first processing element PE1 and the third processing element PE3. Further, the second processing element PE2 and the fourth processing element PE4 have to continuously store the reused elements "9" and "10" from the first convolution cycle T0, time=0 that the reused elements "9" and "10" are initially input to the eighth convolution cycle T7, time=7 that the reused elements "9" and "10" are to be reused.

Since an element "19" among elements "10", "18", "11", and "19" of the ninth division map IDIV8 to be used in the ninth convolution cycle T8, time=8 is a new element, the new element "19" may be provided from the global buffer GBUF (see 313 of FIG. 4 or 430 of FIG. 6). Since the reused elements "10" and "11" to be reused in the column direction have been already stored in the fourth processing element PE4 and the second processing element PE2 in the first convolution cycle T0, time=0 and the second convolution cycle T1, time=1, and the reused element "18" to be reused in the row direction has been already stored in the third processing element PE3 in the eighth convolution cycle T7, time=7, the new element "19" in the ninth convolution cycle T8, time=8 may be stored in the first processing element PE1. Further, the fourth processing element PE4 has to continuously store the reused element "10" from the first convolution cycle T0, time=0 that the reused element "10" is initially input, the second processing element PE2 has to continuously store the reused element "11" from the second convolution cycle T1, time=1 that the reused element "11" is initially input, and the third processing element PE3 has to continuously store the reused element "18" from the eighth convolution cycle T7, time=7 that the reused element "18" is initially input.

The first processing element PE1 has to continuously store the reused element "17" until the fifteenth convolution cycle T14, time=14 that the element "17" included in the fifteenth division map IDIV14 is to be reused, and the third processing element PE3 has to continuously store the reused element "18" until the sixteenth convolution cycle T15, time=15 that the element "18" included in the sixteenth division map IDIV15 is to be reused.

When the elements reused in the row and column directions are operated in the single processing element PE during 49 convolution cycles, the data transfer count from the global buffer GBUF (see 313 of FIG. 4 or 430 of FIG. 6) and the update count in the PE input buffer PIBUF are 64 and 64, respectively, and thus the data movement amount may be reduced as compared with the row-wise reuse method.

Accordingly, the movement of the elements reused in the row or column direction may be restricted, and thus the data movement amount may be remarkably reduced.

Figure 11A:
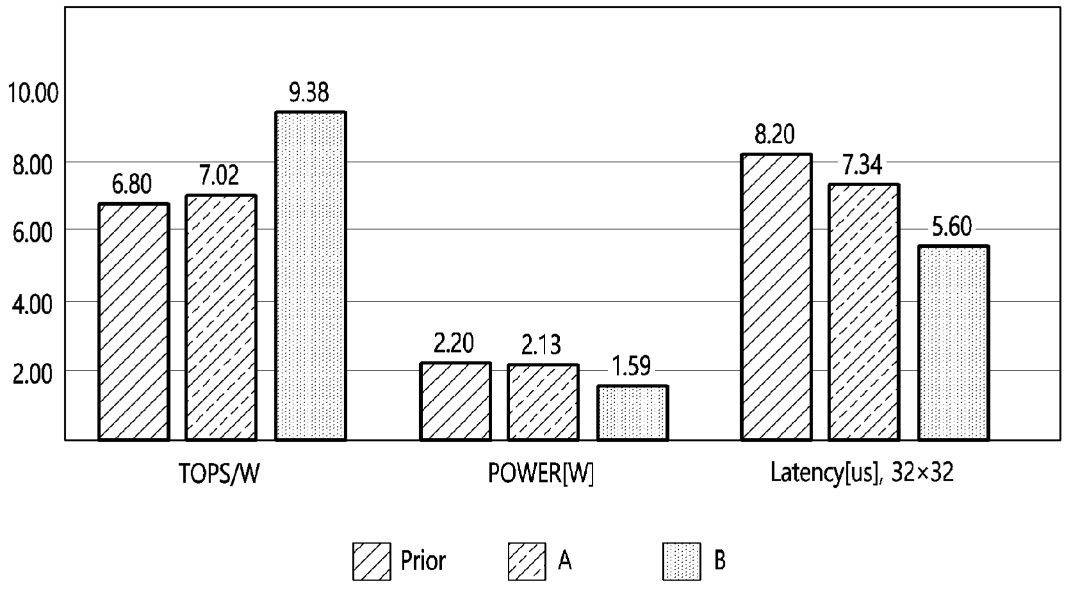
FIGS. 11A and 11B are graphs for describing data processing efficiency according to a data reuse method according to an embodiment of the present disclosure.
Figure 11B:
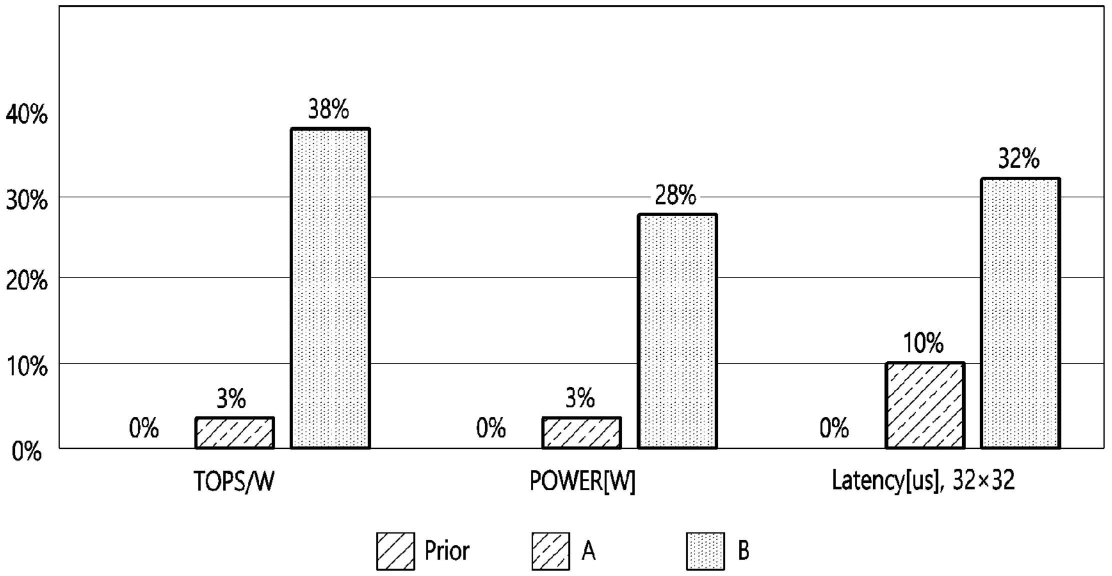

FIGS. 11A and 11B are diagrams for describing data processing efficiency according to a data reuse method according to an embodiment of the present disclosure.

FIG. 11A illustrates measurement values of performance factors for the related art Prior that data moves between the processing elements PE, the row-wise reuse method A, and the row-wise and column-wise reuse method B. The performance factors may be classified into Tera-Operations Per Second per Watt TOPS/W, power consumption POWER, and data processing latency Latency.

FIG. 11B illustrates relative values that the measurement values illustrated in FIG. 11A are compared with the related method Prior.

It can be seen from FIG. 11B that the performance factors in the row-wide reuse method A are improved as compared with the related method Prior. In particular, the latency is remarkably improved by about 10%.

It can be seen from FIG. 11B that the performance factors in the row-wise and column-wise reuse method B are remarkably improved as compared with the related method Prior as well as the row-wise reuse method A.

As the data movement is restricted in the neural network processor configured to process massive data as in the present disclosure, speed degradation and bottleneck due to data transfer overhead may be prevented. Further, power consumption may be considerably reduced and data processing speed may be improved, and thus an efficient neural network operation may be possible.

The above described embodiments of the present disclosure are intended to illustrate and not to limit the present disclosure. Various alternatives and equivalents are possible. The disclosure is not limited by the embodiments described herein. Nor are the embodiments limited to any specific type of semiconductor device. Other additions, subtractions, or modifications are apparent in view of the present disclosure and are intended to fall within the scope of the appended claims. Furthermore, the embodiments may be combined to form additional embodiments.

What is claimed is:

1. A data processing system comprising:

a controller configured to receive a neural network operation processing request from a host device; and an in-memory computing device including a plurality of processing elements and configured to:

receive an input feature map and a weight filter from the controller, and perform a neural network operation in the plurality of processing elements based on the weight filter and a plurality of division maps generated from the input feature map, wherein the in-memory computing device performs the neural network operation by storing a reused element, which is operated at least twice among elements constituting the plurality of division maps during the neural network operation, only in one processing unit that first operates the reused element among the plurality of processing units, wherein the reused element includes both elements reused in a row direction and elements reused in a column direction.

2. The data processing system of claim 1, wherein the reused element is input to one of the plurality of processing elements only once.

3. The data processing system of claim 1, wherein the in-memory computing device performs the neural network operation by performing a plurality of cycles of the neural network operation, each of the cycles being performed by applying the weight filter to a corresponding division map of the plurality of division maps, and wherein the reused element is an element used in at least two of the cycles.

4. The data processing system of claim 1, wherein the in-memory computing device is further configured to generate the plurality of division maps by dividing the input feature map based on a size of the weight filter and a stride as a moving interval of the weight filter.

5. The data processing system of claim 1, wherein the in-memory computing device includes:

a global buffer in which the input feature map and the weight filter are stored;

a computing memory including the plurality of processing elements and configured to perform the neural network operation by receiving the plurality of division maps and the weight filter; and a scheduler configured to:

store all elements of the weight filter in the processing elements, and distribute and provide the elements of the respective division maps to the processing elements, and wherein the scheduler distributes and provides the elements by:

transferring a new element to be initially used in the neural network operation among the elements of the division maps from the global buffer to a corresponding processing element among the plurality of processing elements, and allowing the reused element to be retained in a corresponding processing element, to which the reused element is initially provided among the plurality of processing elements.

6. The data processing system of claim 1, wherein each of the plurality of processing elements includes a plurality of sub arrays, and wherein the in-memory computing device performs the neural network operation further by:

selecting processing elements corresponding to a number of elements of the weight filter among the plurality of processing elements, distributing and storing the elements of the weight filter in the plurality of sub arrays included in the selected processing elements, and distributing and inputting the elements of the respective division maps to the selected processing elements.

7. The data processing system of claim 6, wherein each sub array is configured of an array of memory cells including memristor devices.

8. The data processing system of claim 1, wherein the in-memory computing device performs the neural network operation on each of the plurality of division maps generated by moving, within the input feature map, a convolution window to the row or the column direction at a fixed interval, and wherein the reused element is an element overlapping between division maps generated by moving the input feature map in the row direction and/or the column direction according to the convolution window.

9. A data processing system comprising:

a global buffer in which an input feature map and a weight filter are stored;

a computing memory including a plurality of processing elements and configured to perform a plurality of cycles of a neural network operation by receiving the weight filter and a plurality of division maps generated from the input feature map; and a scheduler configured to:

select processing elements corresponding to a number of elements of the weight filter among the plurality of processing elements, store all elements of the weight filter in the selected processing elements, and distribute and store elements of the respective division maps in the selected processing elements, wherein the scheduler distributes and stores the elements of the respective division maps by allowing a reused element, which is operated at least twice among the elements of the division maps during the neural network operation, to be retained in a corresponding single processing element, to which the reused element is initially provided among the plurality of processing elements, and the scheduler stores the reused element only in one processing unit that first operates the reused element, wherein the reused element includes both elements reused in a row direction and elements reused in a column direction.

10. The data processing system of claim 9, wherein the scheduler distributes and stores the elements of the respective division maps further by:

transferring a new element to be initially used in the neural network operation among the elements of the division maps from the global buffer to a corresponding processing element among the plurality of processing elements, and allowing the reused element not to be moved between the plurality of processing elements.

11. The data processing system of claim 9, wherein each of the plurality of processing elements includes a plurality of sub arrays, and wherein the scheduler stores all elements of the weight filter in the selected processing elements by distributing and storing the elements of the weight filter in the plurality of sub arrays included in the selected processing elements.

12. The data processing system of claim 11, wherein each sub array is configured of an array of memory cells including memristor devices.

13. The data processing system of claim 9, wherein the scheduler is further configured to generate the plurality of division maps generated by moving, within the input feature map, a convolution window to the row or the column direction at a fixed interval, and wherein the reused element is reused in any direction of the row and the column directions.

14. An operating method of a data processing system comprising:

receiving, by a controller, a neural network operation processing request from a host device;

receiving, by an in-memory computing device including a plurality of processing elements, an input feature map and a weight filter from the controller;

generating, by the in-memory computing device, a plurality of division maps from the input feature map; and performing, by the in-memory computing device, a neural network operation through at least partial processing elements among the plurality of processing elements based on the plurality of division maps and the weight filter, wherein the performing of the neural network operation includes controlling a reused element, which is operated at least twice among elements constituting the division maps during the neural network operation, to be stored only in one processing unit that first operates the reused element among the plurality of processing units between the processing elements, wherein the reused element includes both elements reused in a row direction and elements reused in a column direction.

15. The method of claim 14, wherein the performing of the neural network operation further includes inputting the reused element to one of the plurality of processing elements only once.

16. The method of claim 14, wherein the neural network operation is performed by performing a plurality of cycles of the neural network operation, each of the cycles being performed by applying the weight filter to a corresponding division map of the plurality of division maps, and wherein the reused element is an element used in at least two of the cycles.

17. The method of claim 14, wherein the plurality of division maps is generated by dividing the input feature map based on a size of the weight filter and a stride as a moving interval of the weight filter.

18. The method of claim 14, wherein the controlling includes:

transferring a new element to be initially used in the neural network operation among the elements of the division maps from a buffer to a corresponding processing element among the plurality of processing elements; and allowing the reused element to be retained in a corresponding processing element, to which the reused element is initially provided from, among the plurality of processing elements.

19. The method of claim 14, wherein the controlling includes:

selecting processing elements corresponding to a number of elements of the weight filter among the plurality of processing elements;

distributing and storing elements of the weight filter in a plurality of sub arrays included in each of the selected processing elements; and distributing and inputting the elements of the respective division maps to the selected processing elements.

20. The method of claim 14, wherein the plurality of division maps is generated by moving, within the input feature map, a convolution window to the row or the column direction at a fixed interval, and wherein the reused element is reused in any direction of the row and the column directions.

21. A computing system comprising:

a host device; and a data processing system configured to:

generate a plurality of division maps from an input feature map in response to a neural network operation processing request from the host device, and perform a neural network operation in a plurality of processing elements based on a weight filter and the plurality of division maps, wherein the data processing system performs the neural network operation by storing a reused element, which is operated at least twice among elements constituting the plurality of division maps during the neural network operation, only in one processing unit that first operates the reused element among the plurality of processing units, wherein the reused element includes both elements reused in a row direction and elements reused in a column direction.

22. The computing system of claim 21, wherein the reused element is input to one of the plurality of processing elements only once.

23. The computing system of claim 21, wherein the data processing system performs the neural network operation by:

transferring a new element to be initially used in the neural network operation from a buffer to a corresponding processing element among the plurality of processing elements, and allowing the reused element to be retained in a corresponding processing element, to which the reused element is initially provided from, among the plurality of processing elements.

24. The computing system of claim 21, wherein each of the plurality of processing elements includes a plurality of sub arrays, and wherein the data processing system performs the neural network operation further by:

selecting processing elements corresponding to a number of elements of the weight filter among the plurality of processing elements, distributing and storing the elements of the weight filter in the plurality of sub arrays included in the selected processing elements, and distributing and inputting the elements of the division maps to the selected processing elements.

25. The computing system of claim 24, wherein each of the plurality of sub arrays is configured of an array of memory cells including memristor devices.

26. The computing system of claim 21, wherein the data processing system generates the plurality of division maps by moving, within the input feature map, a convolution window to the row or the column direction at a fixed interval, and wherein the reused element is reused in any direction of the row and the column directions.

27. An in-memory computing device comprising:

processing elements (PEs) configured to perform a convolution operation on a filter and a division map at each cycle, each PE being configured to perform the convolution operation on an assigned filter element and an assigned map element; and a control unit configured to:

assign filter elements from the filter to the respective PEs, divide an input map into division maps such that partial map elements are shared by two of the division maps, and assign, at each cycle, map elements from a selected division map to the respective PEs, wherein the control unit is further configured to control a selected PE to perform the convolution operation on a re-cycled map element without assigning again the re-cycled map element to the selected PE, at a current cycle, and wherein the control unit assigns the re-cycled map element to the selected PE at a previous cycle, and the control unit stores the reused element only in one processing unit that first operates the reused element, wherein the reused element includes both elements reused in a row direction and elements reused in a column direction.

* * * * *